Feb. 17, 1942.   M. KLEIN   2,273,711
PIEZOCRYSTAL DEVICE
Filed Aug. 22, 1940   3 Sheets-Sheet 1

INVENTOR
Mark Klein
BY
John J. Rogan
ATTORNEY

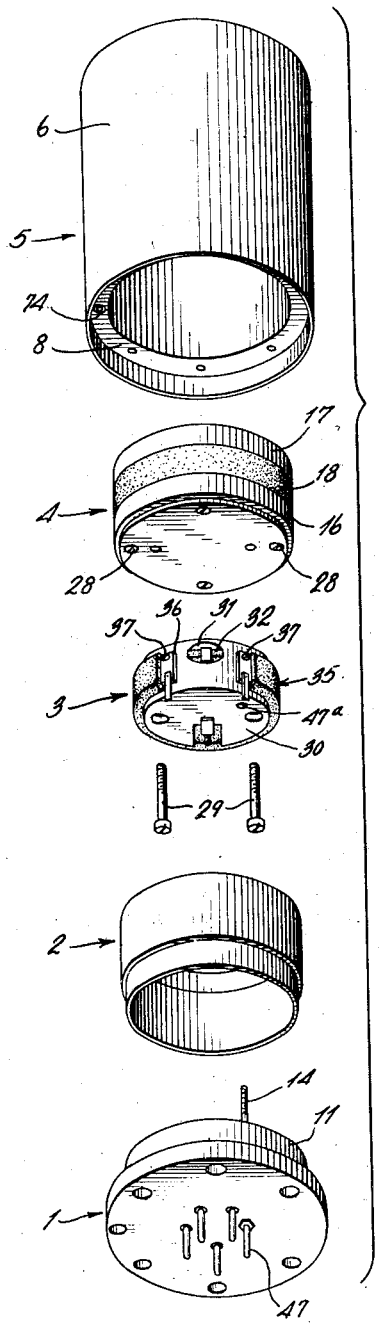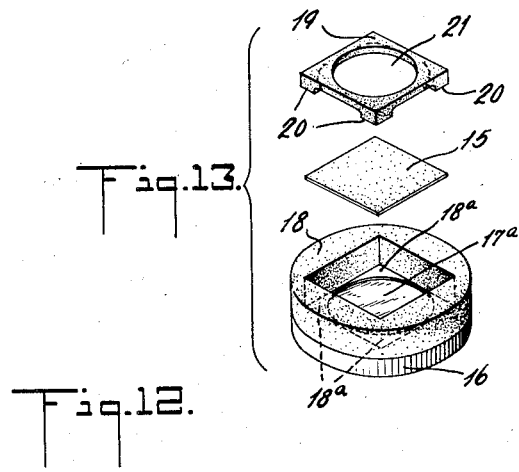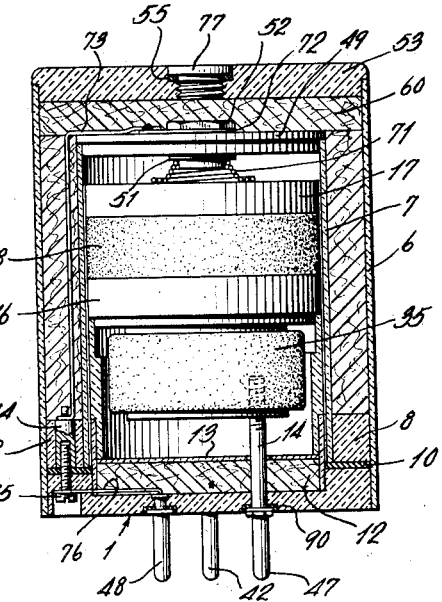

Feb. 17, 1942.　　　　　M. KLEIN　　　　　2,273,711
PIEZOCRYSTAL DEVICE
Filed Aug. 22, 1940　　　　3 Sheets—Sheet 3
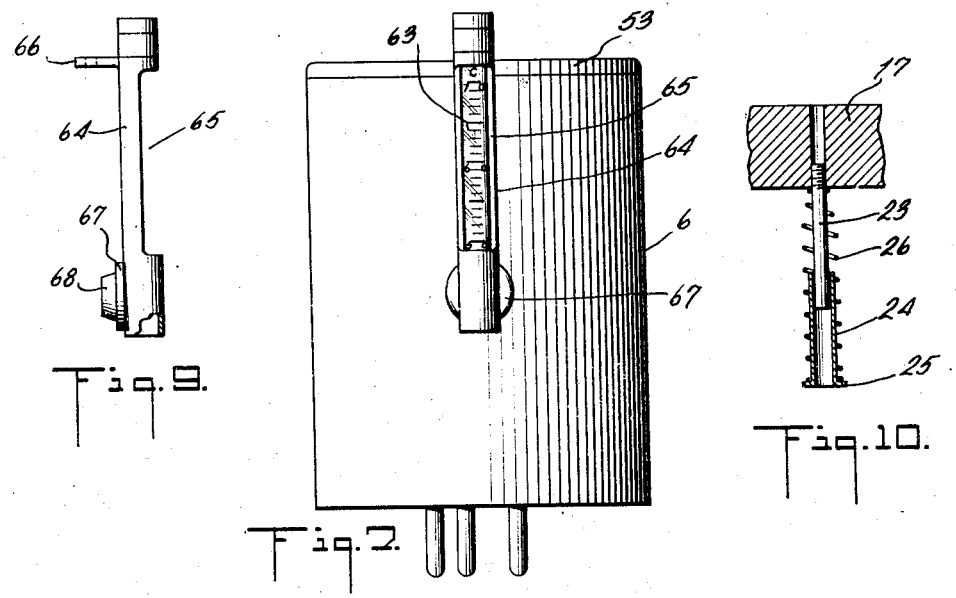
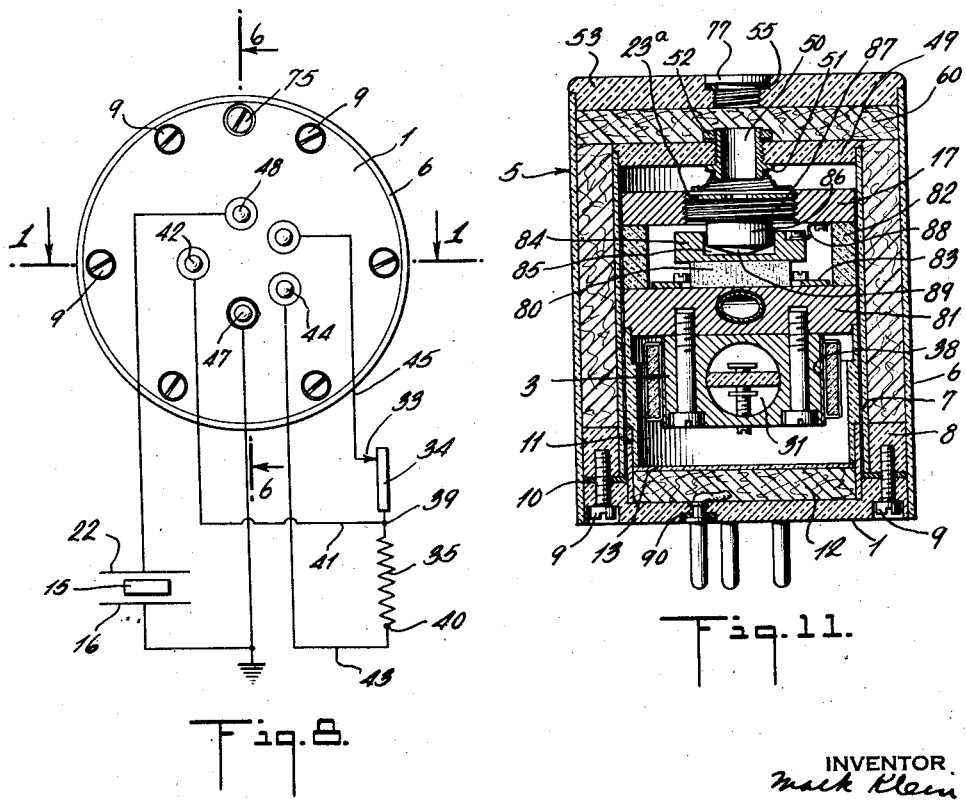
INVENTOR.
Mark Klein
BY John J. Rogan
ATTORNEY Patented Feb. 17, 1942

2,273,711

UNITED STATES PATENT OFFICE 2,273,711

PIEZOCRYSTAL DEVICE

Mark Klein, Flushing, N. Y., assignor to Premier Crystal Laboratories, Inc., New York, N. Y., a corporation of New York Application August 22, 1940, Serial No. 353,643

14 Claims. (Cl. 171—327)

This invention relates to piezo crystal devices and more especially to improvements in temperature-controlled piezo crystals.

A principal object of the invention is to provide an improved manner of retaining a piezo crystal of the adjustable air gap type.

Another object is to provide an improved holder and housing for a piezo crystal unit designed to be maintained at a constant internal temperature over a wide range of external or ambient temperatures, and one which is capable of reliable operation and maximum stability under extremely unfavorable climatic and service conditions. As a result the device according to the invention is well suited for use on mobile craft such as aeroplanes, naval or marines vessels, and in fact any situation where exposure to dust, moisture or extremes of temperature and vibration constitute a severe handicap to crystal stability.

Another object is to provide an improved temperature-controlled holder for piezo crystals of the contact type as well as those of the air gap type.

Another object is to provide an improved piezo crystal housing of the plug-in type having specially designed means to connect with the ungrounded electrode either at the top of the housing or through one of the prongs.

A feature of the invention relates to an improved heat insulating and moisture-proof housing for a piezo crystal device.

Another feature relates to a piezo crystal housing and assembly whereby the crystal unit proper can be assembled and tested as a complete unitary assembly either within or independently of the temperature-controlled housing. As a result of this feature the crystal unit proper is readily assembled and removed from the housing as conditions may require.

A further feature relates to a piezo crystal unit and a temperature-controlled insulating housing with a pronged plug-in base, the housing being constructed in a plurality of parts for easy telescoping assembly and with a minimum of heat conduction from the crystal proper to the socket into which the unit is plugged.

Another feature relates to a piezo crystal holder which in itself is sealed and provided with a filling of inert gas, the holder being also enclosed in a heat insulating housing having a pronged plug-in base, the said housing being likewise provided with a filling of an inert gas and being moisture-proof and dust-proof.

A further feature relates to an improved contacting arrangement between a crystal electrode and an external prong or cap carried by a heat insulating housing within which the crystal unit is enclosed.

A further feature relates to a so-called "sandwich" type piezo crystal unit and a heat insulating housing, together with a thermometer supported on the housing and extending into the body of one of the crystal electrodes whereby the temperature of the crystal may be more accurately indicated.

A further feature relates to a spring clamped crystal having specially designed spacing guides for retaining the coiled clamping springs in axial parallelism thus insuring that the clamping action is always substantially perpendicular to the face of the crystal.

A still further feature relates to the novel organization, arrangement and relative location and inter-connection of parts which constitute an improved and easily assembled temperature-controlled piezo crystal device.

Other features and advantages not specifically enumerated will be apparent after a consideration of the following detailed descriptions and the appended claims.

While the inventive concept will be disclosed herein in certain preferred embodiments, it will be understood that this is done merely for explanatory purposes and not by way of limitation thereto. Accordingly in the drawings, Fig. 1 is a central vertical sectional view through a crystal holder and housing embodying features of the invention.

Figs. 2, 3, 4 and 5 are horizontal sectional views of Fig. 1 taken respectively along the lines 2—2, 3—3, 4—4 and 5—5 viewed in the direction of the arrows.

Fig. 6 is another view of Fig. 1 partly in section and showing a modification of the manner of making contact to the upper electrode of the crystal holder.

Fig. 7 is an external assembled view of Fig. 1.

Fig. 8 is a composite diagram representing a bottom view of Fig. 1 and the schematic circuit connections to the various prongs.

Fig. 9 is a detailed view of the thermometer protective housing and support.

Fig. 10 is an enlarged detailed view of one of the crystal resilient clamping devices.

Fig. 11 shows the housing of Figs. 1 and 6 but with a crystal unit of the contact type.

Fig. 12 is an exploded view of the more important sections of the device to show the manner in which they are assembled.

Fig. 13 is an exploded view showing the relation between the crystal and the retainer insert of Fig. 1.

Figure 1:
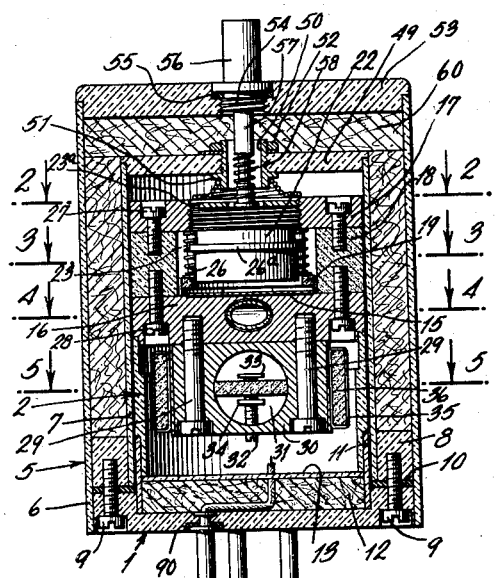
Figure 2:
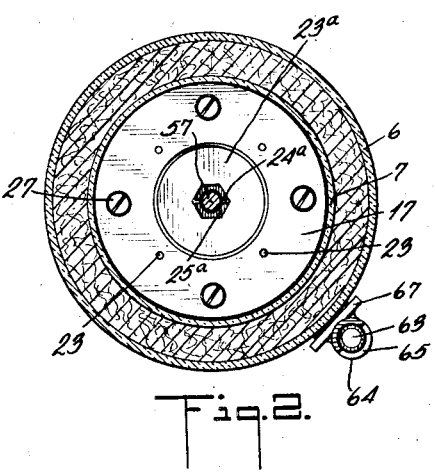
Figure 3:
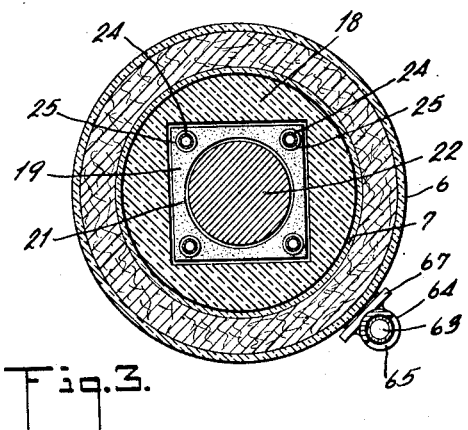

The invention is in the nature of an improvement on the type of device disclosed in Patent No. 2,131,826. In general the device according to the invention is designed to reduce the manufacturing and assembly cost while at the same time improving the ease of testing the crystal and rendering it moisture-proof, dust-proof and with a maximum of independence of outside temperature and pressure conditions. In prior devices where the greatest stability is required, elaborate arrangements have been provided in the form of crystal ovens with thermostat controls which, while suitable for stationary use, are not very practical for mobile use such as in aeroplanes, naval vessels, tanks and the like because of the bulk and considerable weight of the parts necessary to control the stability. The device acording to the present invention represents an attempt to approximate if not entirely equal the stability of such prior oven controlled units, while allowing the device to be used under practically all kinds of service conditions whether mobile or stationary.

Referring to Fig. 12, the device comprises in general five sections consisting of a base section 1 having a plurality of downwardly depending rigid contact prongs fastened therein; a spacing collar 2; a thermostatically controlled heater 3; a crystal unit 4 including a holder containing a piezo crystal with its adjusting means; and a heat insulating casing 5. These parts are so designed and proportioned that by removing a minimum number of fastening screws, each of the sections can be rapidly disassembled and conversely they can be rapidly assembled. Furthermore, the parts 1, 2 and 5 are preferably fashioned out of an insulating material of low dielectric loss such for example as a phenolic material such as "Bakelite." The parts are fitted together so as to provide a moisture-proof and dust-proof enclosing housing and one which is effectively gas-tight. As shown more clearly in the cross-sectional view of Fig. 1, the casing section 5 is double-walled, the outer wall 6 being sufficiently long to overlap the rim of base section 1 when the device is completely asesmbled. The inner wall 7 is spaced from the outer wall by means of an annular block 8 of similar insulating material. Preferably the parts 6, 7 and 8 are fitted tightly together and if desired a layer of water-proof cement or lacquer may be used to render the joints gas-tight and moisture-proof. The base section 1 is fastened to the block 8 by a series of screws 9, the heads of which are recessed below the bottom surface of the base, these recesses being filled with wax or other suitable means to act as a telltale should the device be tampered with after final assembly and test. Preferably a rubber or similar water-tight compressible gasket 10 is located between the abutting ends of member 7, 8, and base 1. Base 1 is provided on its inner face with a circular recess into which is tightly fitted and preferably cemented a thin walled cylindrical member 11 also of insulating material similar to parts 6 and 7. A layer of felt or other suitable heat insulating material 12 is seated in the recess in base 1 and is held in place by a disc 13 of insulating material such as "Bakelite." The disc 13 has two perforations, one to provide a passage for the mutually insulated flexible conductors connecting the several prongs to the various internal parts as schematically shown in Fig. 8, the other perforation allows the shank 14 (Fig. 6) of one of the prongs to pass therethrough for purposes to be described.

The crystal unit 4 is a self-contained one, forming a gas-tight holder and housing for the crystal 15. This holder comprises in general a thick metal base 16 of aluminum, duralumin or other non-corrodible light-weight metal alloy; a top metal cover 17 of the same metal; and an intermediate block 18 of a ceramic such as porcelain or "Isolantite" having a rectangular or square opening of slightly greater dimensions than the crystal so that the crystal can be readily deposited therein. Preferably the abutting surfaces of member 16, 17 and 18 are machined, ground or lapped so that when they are tightly fastened together they form an effective gas-tight seal as described in application Serial No. 346,101. The member 16 constitutes one of the crystal electrodes and preferably its inner surface is provided with a circular shallow recess 17ᵃ (Fig. 13) so that the crystal 15, which is rectangular or square, rests on the unrecessed corner portions 18ᵃ of electrode 16, and the major portion of the crystal area is slightly spaced from the bottom of the recess 17ᵃ. The crystal is resiliently held in place by a square or rectangular insert 19 of ceramic having lateral dimensions approximating those of the crystal. The insert 19 has its underface undercut so as to provide four raised corners 20 corresponding in shape to the corner portions 18ᵃ. Insert 19 is also provided with a circular opening 21 which is slightly larger in diameter than the diameter of the adjustable electrode 22. The member 19 is maintained in contact with the crystal corners by means of four spring-pressed retainers, one of which is shown in an enlarged form in Fig. 10. Each retainer comprises a metal rod 23 which is threaded into member 17. Slidably telescoped on rods 23 are respective tubular metal members or eyelets 24 each of which has a flange 25 at its lower end. A coiled compression spring 26 surrounds members 23 and 24, one end of the spring engaging the member 17 and the other end engaging the flange 25. Thus the spring 26 maintains the flange 25 resiliently in engagement with the corner portions of member 19 to resiliently clamp the crystal at its corner portions only between electrode 16 and member 19. By this arrangement, the crystal is resiliently clamped and any distortion of the springs 26 does not effect the direction or effect of the clamping pressure since the pressure is transmitted to the member 19 by flanged member 24. By reason of the telescoping relation between members 23 and 24, the latter is constrained to move substantially entirely in a direction perpendicular to the crystal face.

The adjustable electrode 22 has one end threaded into a corresponding threaded opening in member 17 and is locked in place by a thin metal locking disc 23ᵃ which is likewise threaded into the said opening. The upper end of electrode 17 has a slot 24ᵃ to receive a screw driver so that the electrode can be turned to vary the width of the air gap between the electrode and the upper surface of crystal 15. However, the locking disc 23ᵃ is preferably provided with a specially shaped opening 25ᵃ so that a special tool is required to unlock the disc before electrodes can be adjusted. This tends to prevent unauthorized adjustment of the electrode. Preferably, electrode 17 has a peripheral ridge 26ᵃ which is larger in outside diameter than the opening in member 17. Consequently the crystal cannot be removed or tampered with, without entirely disassembling the crystal unit. This further tends to obviate unauthorized adjustment and tampering with the crystal. The parts 16, 17, 18, are tightly fastened together by suitable screws 27, 28, and before placing the final fastening screw in place the holder may be provided with a filling of an inert gas at atmospheric or higher than atmospheric pressure.

The thermostat-heater section 3 is attached to the bottom of electrode 16 by means of screws 29. The section 3 comprises a circular metal block 30 preferably of the same metal as electrode 16, and is provided with a transverse opening 31 in which is located the thermostat 32 and the thermostat contacts 33, 34. The block 30 is surrounded by a heater 35 comprising a resistance wire wound around a flexible insulator form 36 which is attached to member 30 by screws 37. Preferably, the resistance wire and form are imbedded in a ceramic insulator and as a further precaution against short circuits, a strip of mica 38 is positioned between the block 30 and the heater. The ends of the heater wire are connected to the terminals 39 and 40 (Fig. 8). One terminal of the heater resistance is connected to the adjustable thermostat contact 34 and thence by an insulated lead wire 41 to prong 42 (Fig. 8). The other terminal of the heater resistance is connected by insulated wire 43 to prong 44; and the other contact 33 of the thermostat is connected by insulated wire 45 to prong 46. All the prongs with the exception of prong 47 (Figs. 6 and 8) are staked and fastened in the base 1, whereas prong 47 is the grounding prong and passes freely through the base 1 and thence through the insulation 12 and disc 13. The upper or shank end 14 of this grounding prong is threaded into a corresponding threaded opening 47ª in member 30. By tightening prong 47 the sections 3 and 4 are held in place, and preferably the lower peripheral edge of electrode 16 is shouldered so as to fit within the upper end of the collar 2. Thus the prong 47 not only acts as a grounding prong but also acts to support the sections 3 and 4 within the heat insulated casing. The upper electrode 22 is connected to prong 48 while the lower electrode 16 is grounded through prong 47.

Tightly fitted within the upper end of wall member 7 is a shouldered insulator cap 49. Cap 49 has a central opening in axial alignment with the crystal section 4. Threaded into the opening in member 49 is a metal bushing 50 which is provided with a shoulder 51 engaging the undersurface of member 49, the bushing being fastened in place by a threaded nut 52. Likewise the top cover 53 of the insulator casing is provided with a central threaded opening to receive a threaded bushing 54. Interposed between bushing 54 and the shoulder in cover 53 is a moisture-proof gasket 55. Bushing 54 also carries an upwardly extending metal contact cap 56. The shank 57 of the bushing is provided with a shoulder against which is seated one end of a coil spring 58. The other end of the spring 58 engages a flanged tubular metal member or eyelet 59 which is adapted to pass through the opening in the locking disc 23 to engage the member 17. Consequently the eyelet 59 is maintained in spring-pressed electrical contact with the member 17 and thus with the upper electrode 26. The space between the cap 49 and the cap 53 is filled with a layer 60 of felt or other suitable heat insulating material, thus completing the insulation of the casing.

Should for any reason it be desired to adjust or test the frequency of the crystal unit without removing it from the casing, all that is necessary is to unscrew the bushing 54 whereupon an adjusting tool may be inserted through the opening in cap 53 to unlock the disc 23ª and then to adjust the electrode 17. After the parts have been finally assembled, adjusted and tested, the insulated casing is evacuated and provided with a filling of an inert gas at approximately atmospheric pressure or higher than atmospheric pressure. This gas filling may be effected through any opening which is later sealed.

Figure 4:
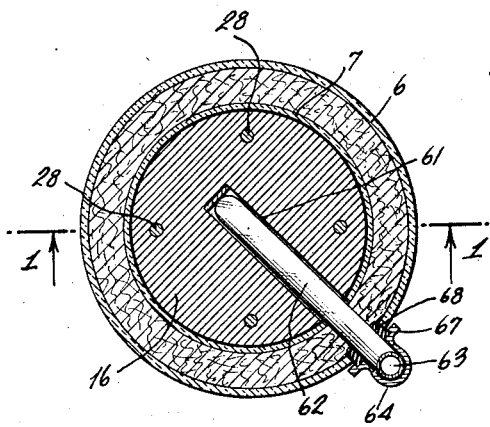
Figure 5:
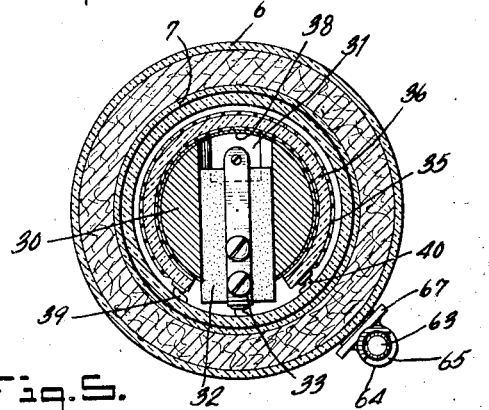

In order that the temperature of the crystal may be accurately indicated, the body of electrode 16 is provided with a passage 61 and located in said passage is the bulb 62 of a right-angled thermometer. The vertical arm 63 of this thermometer is located exteriorly of the casing and extends upwardly parallel thereto as shown more clearly in Fig. 7. For the purpose of supporting the thermometer and protecting it against breakage there is provided a special form of protective housing consisting of a channel-shaped metal member 64 having a cut-out portion 65 to expose the graduations on the thermometer 63. The member 64 is provided, adjacent its upper end, with a right-angle flange 66 by means of which it may be fastened by a suitable screw to the top cover 63. The lower end of member 64 is provided with a metal nipple 67 which is adapted to receive a compressible gasket 68. As shown more clearly in Fig. 4, the gasket 68 is tapered and can be forced into an opening in the wall 6 so as to seal the wall against gas leakage. It will be understood of course that a corresponding aligned opening is provided on the inner wall 7 so that the section 62 of the thermometer can be passed into the passage 61 and the electrode 16.

In the embodiment of Fig. 1, the upper electrode 22 of the crystal unit is connected into circuit through the top contact cap 56. In certain installations, it may be advisable to have all the connections made through the base. For this purpose, there is attached to the lower end of bushing 50 (Fig. 6) a frusto-conical or nested coil spring 71, the lower and wider turns of which press against the member 17. A metal washer 72 is fastened beneath nut 52 and a wire 73 is fastened to the said washer and leads downwardly to connect with an internally threaded metal bushing 74 secured in insulator blocks 8. A screw 75 passes through base 1 to make contact with bushing 74 and this screw is connected by conductor 76 to the prong 48. The remaining parts of Fig. 6 corresponding to those of Fig. 1 bear the same designation numerals. However, in order to preserve the gas-tight character of the housing, the cap contact 56 of Fig. 1 is removed and replaced by a threaded insulator closure bushing 77.

In the foregoing embodiments, the crystal unit is of the air-gap type, but it will be understood of course that the crystal unit may be of the so-called contact type. Thus, as shown in Fig. 1, such a unit is shown in Fig. 11 and parts corresponding to those of Fig. 1 bear the same designation numeral. In this embodiment, the crystal 80 is of the low frequency type and is adapted to rest directly on the electrode 81. The member 17 may be the same as the corresponding member of Fig. 1 but the ceramic member 82 instead of having a screw or rectangular opening may have a circular opening. In order to prevent dislodgement of the crystal, there is fastened to the electrode 81 a metal ring 83 having a circular opening of sufficient size to receive crystal 80. If the crystal 80 is square then the opening in ring 83 may be circular with a diameter approximately the same as the diagonal dimension of the crystal 86. Resting on the crystal 80 is a metal electrode 84 which has a recess 85 in which is seated a tapered projection 86 carried by the screw-threaded metal plug 87 which is threaded into the member 17 and locked in place by the locking disc 23. A flexible metal wire 88 connects the electrode 84 to the member 17. By reason of the tapered end 89 of member 86 engaging the bottom of recess 85, the electrode 84 rests flat against the upper face of crystal 80. Consequently, the member 87 may be turned without disturbing the contact relations between the crystal 80 and the electrode 84. For a detailed description of this type of crystal holder, reference may be had to application Serial No. 346,101, filed July 18, 1940. The remaining parts of Fig. 11 are the same as those of Fig. 1 and Fig. 6 and further detailed description thereof is not deemed necessary. In order to insure the gas-tightness of the outer casing suitable compressible gaskets 90 are provided around each of the contact prongs where they engage the base 1.

What I claim is:

1. In a piezo-crystal device, a heat insulated gas-tight casing comprising tubular inner and outer members, end closure members for the outer casing and joined thereto in a gas-tight manner, one of said closure members carrying a plurality of rigid contact prongs, a removable closure plug in the other closure member, a unitary assembly of piezo-crystal and holder mounted within said casing, said unitary assembly having a frequency adjusting member in alignment with said plug whereby said crystal can be adjusted without removing it from the casing.

2. A piezo-crystal device according to claim 1, in which said plug has a portion extending through said other closure member and carries a spring-pressed contact for completing the electrical connection to one of the electrodes of said unitary assembly.

3. A piezo-crystal device comprising an insulator base carrying a plurality of rigid contact prongs, a tubular spacer member carried by said base, a unitary assembly of piezo-crystal and holder supported on the edge of said spacer member, and a gas-tight heat insulated housing telescoped over said unitary assembly and said spacer and fastened to said base.

4. A piezo-crystal device according to claim 3 in which a right-angled thermometer is supported on said casing with the bulb portion extending through the said casing and into the body of one of the crystal holder electrodes.

5. A piezo-crystal device comprising a crystal holder including a hollow ceramic member closed at its upper and lower ends by metal members to define a crystal chamber, a crystal supported within said chamber, a substantially completely heat-insulated casing enclosing said holder, a passage in the body of said lower end closure member, an opening in the wall of said casing in alignment with said passage, a right-angled thermometer having the bulb portion extending through said opening into said passage, and having its indicator portion extending outwardly of and along said casing, and a protective housing for said indicator portion, said housing being rigidly fastened to said casing.

6. A piezo-crystal device according to claim 5 in which a gas-tight gasket is provided around the portion of the thermometer as it passes through said casing.

7. A piezo-crystal device according to claim 5 in which said lower end closure member constitutes one of the crystal electrodes upon which the crystal rests, and a passage is provided therein underneath the crystal and in close proximity thereto, the bulb portion of said thermometer being located in said passage.

8. A piezo-crystal holder comprising a tubular ceramic member, metal closure plates fastened to opposite ends of said member to define a crystal chamber, the lower one of said closure plates being a crystal electrode, a shallow recess in the face of said electrode, a piezo-crystal resting on the marginal edge of said recess, a removable ceramic insert in engagement with said crystal, a plurality of spring-pressed members engaging said ceramic insert to press it resiliently against the crystal, and an electrode adjustably mounted in the upper one of said closure plates to define an adjustable air gap above the crystal.

9. A holder according to claim 8 in which said adjustable electrode is provided with a marginal ridge for preventing complete removal of the adjustable electrode without substantially disassembling said holder.

10. A holder according to claim 8 in which said ceramic insert has raised corner portions whereby only marginal portions of the crystal are contacted thereby, said insert being provided with a central opening to allow said adjustable electrode freely to pass into close proximity to said crystal.

11. A piezo-crystal holder comprising a pair of crystal electrodes, a piezo crystal located between said electrodes and upon one of which said crystal rests, and resilient means to press said crystal against said electrode comprising a plurality of pairs of telescoped members, a spring for each pair of telescoped members and normally tending to press one of said telescoped members towards said crystal.

12. A piezo-crystal holder comprising a pair of spaced metal members between which a crystal is located, a plurality of rods carried by one of said metal members, a tubular member slidably telescoped on each rod with its lower end adapted to clamp the crystal against the other of said metal members, and a spring for normally tending to press said tubular member towards the crystal.

13. A piezo-crystal holder comprising a pair of spaced metal plates between which a crystal is located, a plurality of rods carried by one of said metal members, a tubular member slidably telescoped on each of said rods, a compression spring surrounding each rod and engaging the associated tubular member, a ceramic insert having its corner portions resting on the crystal, said corner portions being resiliently engaged by said tubular metal members.

14. A piezo-crystal device comprising a unitary assembly of crystal and crystal holder with the crystal chamber defined by a tubular ceramic member closed at opposite ends by metal plates one of which acts as a crystal electrode, said holder being evacuated and provided with a filling of an inert gas, a heater-thermostat control assembly removably fastened to said first assembly, a substantially completely heat insulated and gas-tight casing enclosing said assemblies, said casing being evacuated and provided with a filling of an inert gas.

MARK KLEIN.